(12) United States Patent
Ward et al.

(10) Patent No.: X8177
(45) Date of Patent: Apr. 30, 1834

(54) FUR, EXTRACTING FROM SKINS, & MANUFACTURING IT IN YARN

(76) Inventors: Levi Ward, assignee of Phebe Atwell

Phebe Atwell of Marion State of New York.

assigned 6
Levi Ward
no drawing

Letters Patent.

The schedule referred to in these Letters Patent, and making part of the same containing a description in the words of the said Phebe Atwell herself of her improvement in the useful art or manufacture being the extracting of fur from skins so as to allow of its manufacture into yarn for gloves &c. which invention she has assigned in due form of law to Levi Ward which assignment is recorded in the Patent Office in the Book of Transfers Vol 5. pages 360 & 361 —

To all to whom these presents shall come,
Be it known that Phebe Atwell of Marion in the County of Wayne & State of New York has invented a new and useful art & manufacture being the extracting of fur from skins so as to allow of the manufacture of the fur into yarn & the manufacture of the same into yarn for the purpose of gloves, mittens & all other purposes to which yarn is applicable, which invention the said Phebe Atwell has assigned & transferred to Levi Ward of Walworth in the county aforesaid & that the following is a full and exact description of the process of extracting fur from skins so as to allow of the manufacture of the fur into yarn & manufacturing the fur into yarn for the purpose of gloves mittens and all other purposes to which yarn is applicable as invented by her.

First apply Alkali to the flesh side of the skin until the hair and fur become loose then pull out & remove the hair & afterwards pull out out the fur. The fur after being pulled out is to be dried, then oiled, then carded with fine cards in the manner of carding wool for spinning & then spun in the manner of spinning wool.

In witness whereof I have hereunto subscribed my name the twenty seventh day of March 1834

Phebe Atwell

Witnesses
John Stevens
Phenix Atwell 350 words

[illegible]
[illegible]